United States Patent

[11] 3,622,851

| [72] | Inventor | Toshihide Hanada |
| | | Yokohama-shi, Japan |
| [21] | Appl. No. | 859,722 |
| [22] | Filed | Sept. 22, 1969 |
| [45] | Patented | Nov. 23, 1971 |
| [73] | Assignee | Pioneer Electronic Corporation |
| | | Tokyo, Japan |

[54] TRANSISTOR MOTOR
2 Claims, 2 Drawing Figs.

| [52] | U.S. Cl. | 318/138, 318/254 |
| [51] | Int. Cl. | H02k 29/00 |
| [50] | Field of Search | 318/254, 138, 696, 685 |

[56] References Cited
UNITED STATES PATENTS

| 3,156,858 | 11/1964 | Reitherman | 318/138 |
| 3,210,631 | 10/1965 | Niccolls | 318/254 X |
| 3,241,018 | 3/1966 | Stockmans | 313/254 X |
| 3,461,367 | 8/1969 | Takeyasu et al. | 318/254 X |

*Primary Examiner*—G. R. Simmons
*Attorney*—Sughrue, Rothwell, Mion, Zinn and Macpeak

ABSTRACT: A single-ended, transistorized push/pull circuit amplifies the output of a generator mechanically interlocked to the transistorized motor rotor and is connected across the drive winding of the motor for driving the same.

PATENTED NOV 23 1971

3,622,851

INVENTOR
TOSHIDIE HANAOA

BY Sughrue, Rothwell, Mion, Zinn & Macpeak
ATTORNEYS.

TRANSISTOR MOTOR

BACKGROUND OF THE INVENTION

1. Field of the Invention

This invention relates to transistorized motors and, more particularly, to such motors whose drive windings are energized by a generator mechanically interlocked with the motor rotor.

2. Description of the Prior Art

In the prior art, as shown in FIG. 1, a transistorized motor includes motor components identified at A including a permanent magnet rotor 1 and a stator 3 which carries an exciting winding 2 wound in multiplex. A generator B includes a permanent magnet rotor 5 which is coupled coaxially by a single shaft or output axis 4 to the rotor 1. The generator includes an armature winding 6 which is coupled to a transistorized control circuit C. The control circuit employs transistors $T_1$ and $T_2$ connected in push/pull relationship, where opposite ends of the armature winding 6 are respectively connected to the bases of transistors $T_1$ and $T_2$. The armature winding 6 of the generator is further provided with an intermediate lead wire 9 connecting the center point of the armature winding 6 to the midpoint of a lead wire connecting the emitters of the transistors $T_1$ and $T_2$. The collectors of these transistors are connected to the start and finish ends of the motor exciting winding 2. A lead wire 7, extending from the midpoint of the motor exciting winding 2 is connected to the intermediate or midpoint lead wire 9 of armature winding 6 through battery 8. Then, if the permanent magnet rotor 5 is driven by any suitable drive mechanism, a voltage is induced across the armature winding 6 by rotation of the permanent magnet rotor 5. Thereby, each of the transistors $T_1$ and $T_2$ connected in push/pull relationship and of the same polarity, is driven in turn. Namely, the half waves of positive and negative components as at T and T' are obtained at the bases of the transistors $T_1$ and $T_2$ by rotation of the permanent magnet rotor 5. Consequently, the waveform O is obtained at the collector of the transistor $T_1$ in the same manner the waveform O' is obtained at the collector of transistor $T_2$. When each of the collector currents is applied to the exciting winding 2 of the motor, current flows to respective halves of the exciting winding in turn and the stator is excited to drive the motor rotor 1. The rotor 5 of the generator B is of course driven by rotation of the rotor 1 due to the mechanical coupling of shaft 4 and a repetitive process occurs with rotation of motor A continuing.

However, since the illustrated prior art transistorized motor requires midpoint connections to both the motor exciting winding 2 and the generator armature winding 6, there have been deflects in such prior art transistorized motors since the windings are necessarily complicated and requires precision in the manufacture and assembly of the same. Besides, each winding is used only during half of each cycle and hence the efficiency in occupation of space is necessarily low and has a negative effect on the miniaturization of this type of apparatus.

SUMMARY OF THE INVENTION

The present invention has as its object to provide a transistorized motor wherein the number of turns of the control winding, such, as the armature winding of the generator and the motor drive winding comprising an excitation winding, is reduced in half in comparison with the prior motor. Besides, each winding is utilized during the complete cycle and hence utilization is improved, construction is simplified and it is possible to further miniaturize this type of apparatus. To this end, a single-ended, push/pull transistorized amplifying circuit couples the output winding of the generator directly to the drive winding of the motor to drive the same.

DESCRIPTION OF THE PREFERRED EMBODIMENT

Figure 2:
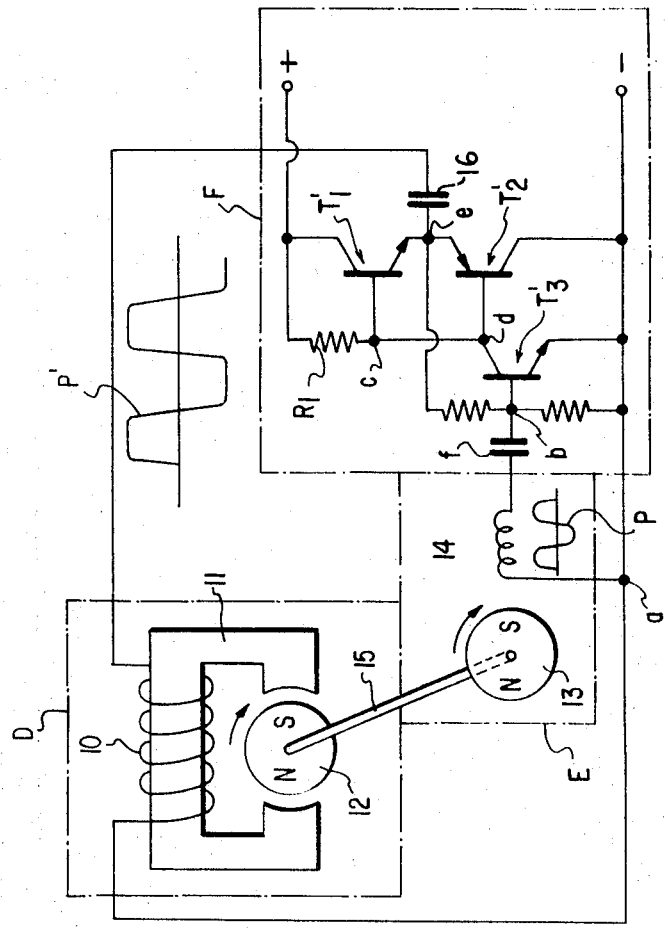
FIG. 2 is an electrical schematic diagram of the transistorized motor of one embodiment of the improved transistorized motor of the present invention.
Figure 1:
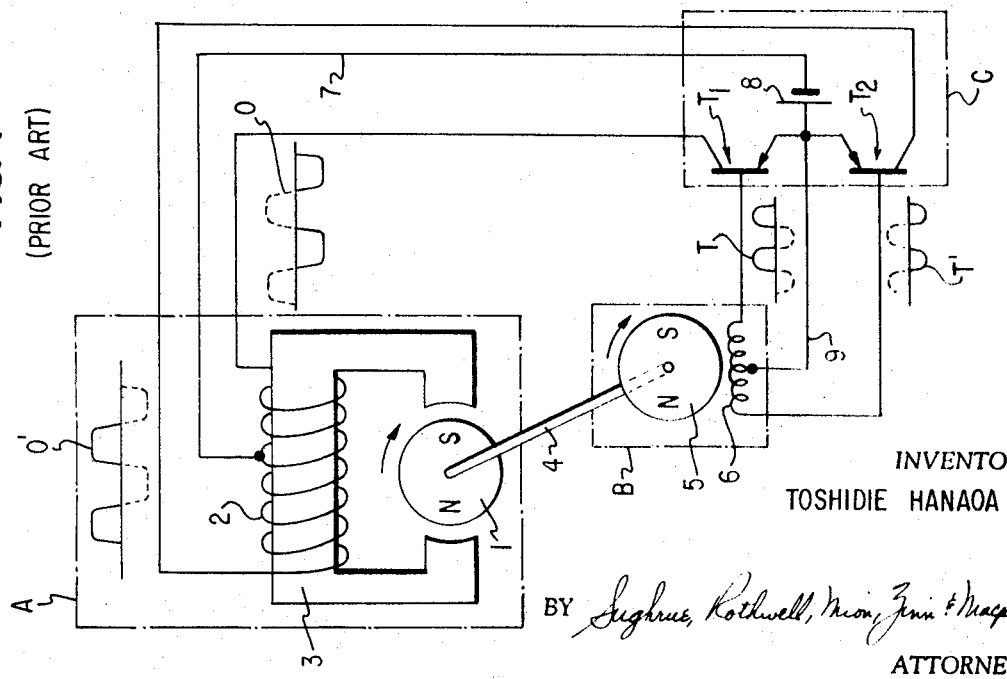
FIG. 1 is an electrical schematic diagram of a transistorized motor of the prior art design.

Turning to FIG. 2, a motor D includes a stator 11 around which is provided a drive winding or exciting winding 10 which in similar fashion to FIG. 1, is wound in multiplex. The permanent magnet rotor 12 is positioned within a magnetic airgap and mounted for rotation. A generator E includes a permanent magnet rotor 13 mechanically interlocked to motor rotor 14 as by connecting shaft 15 such that rotors 12 and 13 are coupled integrally with each other by a rotary axis coupling shaft 15. The generator further includes a control winding 14 which constitutes the armature of the generator and across which a voltage is induced. The control circuit F employs transistors $T_1'$ and $T_2'$ which operate in complementary symmetry and further employs a transistor $T_3'$ for amplifying the control signal induced in control winding 14 of the generator E. The arrangement of transistors $T_1'$, $T_2'$, and $T_3'$ form a single-ended complementary push/pull circuit.

One end of the motor drive winding 10 which is wound about the stator 11, is connected to one end of the generator through winding 14 at connecting point a which point is further connected to the negative terminal of a suitable DC electrical source. The positive terminal of the same source is connected to the base of the NPN transistor $T_1'$ through resistor $R_1$ and via connecting point d to the base of the PNP transistor $T_2'$ and the collector of the NPN transistor $T_3'$. The other end of the control winding 14 of the generator E is connected through a capacitor f to a circuit connection point b which in turn is connected to the base NPN transistor $T_3'$. The opposite end of the drive winding 10 is connected through a capacitor 16 to connection point e which in turn connects the emitters of transistors $T_1'$ and $T_2'$, connection points e and b being connected through a suitable resistor.

In operation, when the permanent magnet rotor 13 is suitably driven, an alternating waveform is applied to the control winding 14 as a control signal and is amplified through the push/pull circuit in such a manner that an alternating output signal P' is applied to the drive winding 10 of the motor D. Consequently, the rotor 12 of the motor D is driven and accordingly, due to the mechanical coupling by shaft 15, the rotor 13 of the generator E continues to rotate and as control signals are generated in the generator, the motor D continues to be driven. In this case, the transistor $T_3'$ acts accordingly to amplify the small control signal obtained from the generator winding 14 and hence can be eliminated if the input control signal is sufficiently large.

In the transistor motor of the present invention, it is not necessary to provide intermediate taps on both the control winding of the generator and the drive winding of the motor and hence winding operations for both components are simple and easily accomplished. Besides, the current flows through the entire drive winding 10 during each complete cycle and thus, a winding of approximately one-half the number of turns is sufficient to provide the same output as the prior art transistor motor of FIG. 1. That is to say, miniaturization of the motor in FIG. 2 is easily achieved. There are additional merits in practice since the number of lead wires required to connect the motor components and the control circuit to each other are thereby reduced and thus the manufacture of the motor, the maintenance of the same, and the inspection during use are enhanced.

I claim:

1. A transistorized motor comprising:
   a. a permanent magnet motor rotor.
   b. a single-ended motor drive winding for driving said motor rotor,
   c. a permanent magnet generator rotor mechanically interlocked with said motor rotor, d. a single-ended generator armature winding associated with said generator rotor, so that an alternating control signal is induced in said armature winding when said generator rotor rotates, e. a single-ended transistorized push-pull circuit connected between said generator armature winding and said motor drive winding for energizing the entire said motor drive winding, said push-pull circuit comprising:

f. a DC power supply, g. a pair of complementary transistors connected across said DC power supply, h. coupling means for applying said alternating control signal to the base electrodes of said complementary transistors so that one of said complementary transistors is rendered conducting by one polarity of said control signal and the other complementary transistor is rendered conducting by the other polarity of said control signal, i. one pair of corresponding output electrodes of said complementary transistors being connected to a common junction, and j. a capacitor connected between one end of said motor drive winding and said common junction so that during one polarity of said control signal energizing current flows from said DC power supply through one of said transistors and said capacitor in one direction through the entire said motor drive winding while charging said capacitor, and during the other polarity of said control signal said capacitor discharges to cause current to flow through the other transistor in the opposite direction through the entire said motor drive winding.

2. A transistorized motor as defined in claim 3 wherein said coupling means comprises a transistor amplifier coupled between one end of said generator armature winding and said base electrodes of said complementary transistors.

* * * * *